United States Patent
Fujiwara

[15] 3,662,257
[45] May 9, 1972

[54] POSITION DETECTOR USING A SWITCHABLE MAGNETIC CORE

[72] Inventor: Nobutsune Fujiwara, Chiba-shi, Japan
[73] Assignee: Fujisash Industries, Ltd., Kanagawa, Japan
[22] Filed: Sept. 8, 1969
[21] Appl. No.: 855,980

[52] U.S. Cl. ..................................324/34 PS, 336/45, 340/282
[51] Int. Cl. .........................................................G01r 33/00
[58] Field of Search.............324/31, 41; 340/21, 382, 258 C, 340/258 D, 282; 246/249; 336/45

[56] References Cited

UNITED STATES PATENTS

| | | | |
|---|---|---|---|
| 2,927,253 | 3/1960 | Mittag | 340/282 |
| 3,048,818 | 8/1962 | Burckhardt et al. | 340/38 L |
| 3,161,387 | 12/1964 | Jutier | 324/41 |
| 3,174,056 | 3/1965 | Leavitt et al. | 340/258 D |

FOREIGN PATENTS OR APPLICATIONS 909,023  10/1962  Great Britain ...........................324/41

OTHER PUBLICATIONS

Shevel, Jr. et al., Non–Destructive Readout of Eccentric Cores, IBM Tech. Disc. Bull., Vol. 6, No. 7, Dec. 1963, p. 44.
Darling, R., High–Reliability Position Sensor, IBM Tech. Disc. Bull., Vol. 12, No. 4, Sept. 1969, p. 536.

Primary Examiner—Rudolph V. Rolinec
Assistant Examiner—R. J. Corcoran
Attorney—Christensen & Sanborn

[57] ABSTRACT

A position detector using a switchable magnetic core comprising a permanent magnet and a detector comprising a ring magnetic core having a primary coil adapted to be energized by a pulsed current and a secondary coil from which a signal is adapted to be taken out to an indicating means. Residual induction of the core is to be disturbed by relative motion of the permanent magnet to the detector. The disturbance is sensed by the indicating means so as to detect the relative motion. The source of the pulsed current and the indicating means may be disconnected from the detector acted on by the permanent magnet and the information may be obtained afterwards by connecting the source of pulsed current and indicating means again.

5 Claims, 18 Drawing Figures

INVENTOR.
NOBUTSUNE FUJINARA
BY
Christensen, Sanborn, & Matthews
ATTORNEYS

POSITION DETECTOR USING A SWITCHABLE MAGNETIC CORE

BACKGROUND OF THE INVENTION

This invention relates to an electromagnetic detecting means in which residual induction and electromagnetic induction are applied.

Heretofore, such a device as the magnetic core matrix has been well known, in which the direction of residual magnetism of a core is varied by reversing the direction of a current flowing across a coil having the core so as to magnetize the core, whereby a current flowing in a read out coil is generated.

Whereas in accordance with such a prior art as above, a variation in direction and quantity of electricity is sensed, in accordance with this invention, a variation in position of a detector relative to an external permanent magnet is sensed, whereby a signalling system required for magnetization and detection is simplified.

SUMMARY OF THE INVENTION

Briefly stated in accordance with one aspect of this invention, there is provided an electromagnetic detecting means comprising a permanent magnet and a detector comprising a detecting element and a source of a pulsed current. The detecting element has a magnetic core having the property of being able to retain a residual induction which is magnetized by application of the pulsed current to a primary coil thereof. Upon the termination of a first pulse from the source of pulsed current, the magnetic core retains a certain residual induction in a first state and acts as a memory element. Upon the application of subsequent pulses to the primary coil, the total flux or induction in the core is only slightly changed. A secondary coil on the core thereby produces a large output pulse for the first input pulse from the source of pulsed current, and small output pulses for subsequent input pulses thereto. However, if the permanent magnet is brought adjacent to the core, the total induction or flux in the core is such that the residual induction thereof is changed to a second or opposite state. Upon removal of the permanent magnet from the vicinity of the core, the next input pulse to the primary coil causes an electromagnetic induction such that the residual induction of the core returns to its first state. The resultant change in induction or flux provides a large output pulse in the secondary winding. This large output pulse and a succeeding small output pulse can then be used as a pulse sequence for detecting the relative motion of the permanent magnet and the detecting element.

In accordance with this invention, it is possible to disconnect the source of the pulsating current from the detecting element, if necessary together with the indicating means, after the core has been magnetized in the first state. Afterwards, any variation in the residual induction may be found by connecting the source of pulsating current and the indicating means again to the detecting element so as to operate the detecting element and the indicating means, whereby any variation in relative position of the permanent magnet to the detecting element during the period between the disconnection and the connection is informed.

In accordance with this invention, since the magnetic field of the core is adapted to be disturbed by the magnetic field of an external permanent magnet, it is not necessary to vary the direction of the current and the peak value thereof for a memory and a read out operation. By virtue of this principle, the source of the pulsed current may be simplified.

In accordance with one embodiment of this invention, the core is made of a ferromagnetic substance, and therefore, the magnetization and the electromagnetic induction require extremely short period or occur quite instantaneously, so that it is easy to sense a high speed motion. Meantime, it is also possible to disturb the magnetic field of the core by a very slow motion of the permanent magnet relative to the core and let the core store the disturbance. By virtue of these facts, it is possible to minimize the core in size and weight. Thus the detecting element may be attached to any desired position of any desired member without substantial addition of size and weight. In addition, the detecting element having a constant performance may be inexpensively mass-produced.

One object of this invention is to provide an electromagnetic detecting means capable of detecting closing and opening motions of fittings such as a sliding door and a swing door, rotation or reciprocation of a machine parts, and the like. Such doors may be not only fittings of a building, but also a part of a safe, wagon, container, and the like.

Another object of this invention is to provide an electromagnetic detecting means of the class described, for which the source of current is simplified.

Still another object of this invention is to provide an electromagnetic detecting means of the class described, which is capable of acting at a high speed.

Further another object of this invention is to provide an electromagnetic detecting means of the class described, of which the core is minimized in size and weight.

A further object of this invention is to provide an electromagnetic detecting means, which is more durable and more stable regarding variation in temperature than either the mechanical switching means or those including semiconductors, and therefore, more reliable.

BRIEF DESCRIPTION OF THE DRAWING

The invention will be better understood and other objects and additional advantages of the invention will become apparent upon perusal of the following description taken in connection with the drawings, in which.

Similar numerals refer to similar parts throughout the several views.

DESCRIPTION OF THE PREFERRED EMBODIMENTS

Figure 1:
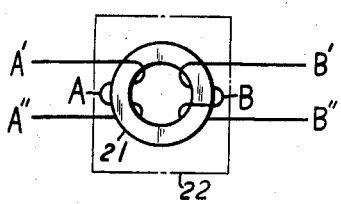
FIG. 1 is a schematic front view of a detecting element embodying this invention.
Figure 2:
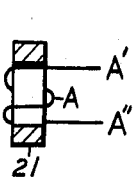
FIG. 2 is a vertically sectional side elevational view thereof.
Figure 3:
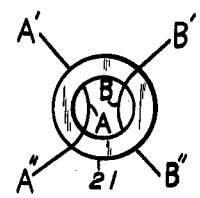
FIG. 3 is a schematic front view of another embodiment of the detecting element.
Figure 4:
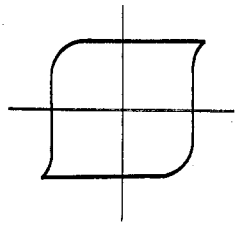
FIG. 4 shows a magnetic characteristic of a core of the detecting element.
Figure 5:
FIGS. 5, 6 and 7 are explanatory views of the core affected by an external magnet.
Figure 6:
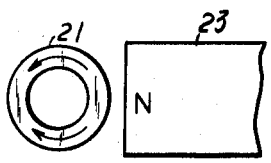
Figure 7:
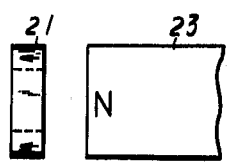

Referring more particularly to the drawings, the preferred embodiments of this invention will now be described; however, this description will be understood to be illustrative of the invention and not as limiting it to the particular methods and structures as shown and described. There is provided a ring core 21 of ferrite as shown in FIGS. 1, 2 and 3, having a residual induction as shown in FIG. 4. A primary coil A and a secondary coil B are wound thereon with terminals A', A'' and B', B'', respectively. When the primary coil A is energized by a direct current, magnetic lines are formed in the core 21 as shown in FIG. 5, which remain as a first state having a first residual induction after the current is broken. When a magnet 23 is made to approach the core 21 as shown in FIGS. 6 and 7 so that the core 21 is affected by the magnetic field of the magnet 23, magnetic lines having another direction from that of the first-named magnetic lines are formed in the core 21, which remain as a second state having a second residual induction until a current flows across the primary coil A again.

When the primary coil A is energized as above so as to magnetize the core 21, the magnetic lines in the core 21 increase so as to generate a current across the secondary coil B. Subsequently, when the primary coil A is energized similarly to the above case, since the direction of the residual induction is not changed and the quantity of induction is only slightly varied, a slight current is generated in the secondary coil B. However, when the residual induction is disturbed by the action of the magnetic field of an external magnet 23, the direction of the magnetic lines and the quantity of magnetism are varied to the second state. When the primary coil A is energized after the external magnet 23 is removed, the magnetically disturbed core 21 is restored from the second state to the first state so that the secondary coil B is affected by the variation in the direction of the magnetic field and the magnetic flux density, and therefore, a large current is generated across the secondary coil B by electromagnetic induction.

Figure 8:
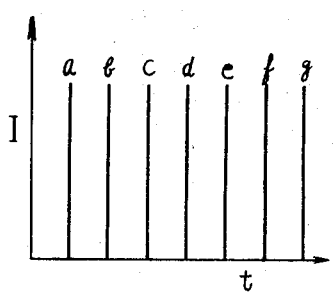
FIG. 8 shows a wave form of an input to the detecting element.
Figure 9:
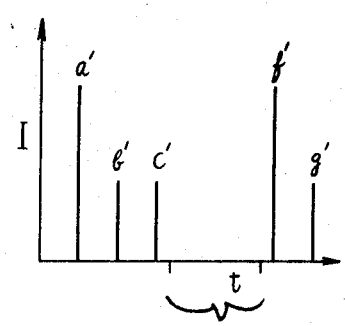
FIGS. 9, 10 and 11 show wave forms of output of the detecting element.

Now a pulsed current is impressed on the primary coil A, of which the wave form is shown in FIG. 8. In the moment a when the primary coil A is firstly energized, a secondary current $a'$ is generated across the secondary coil B as shown in FIG. 9. However, the second pulse b and the third pulse c do not induce secondary currents of the same intensity as the current $a'$ but induce weaker currents $b'$ and $c'$. Subsequently, when a strong magnetic field is externally applied to the core 21 as shown in FIGS., 6 and 7 so as to saturate the latter, in an opposite direction to that initially induced, the secondary coil B does not generate secondary currents correspondingly to the pulses d and e applied to the primary coil A. After the external magnetic field has been removed, the secondary coil B generates a strong current $f'$ corresponding to the first pulse $f$ after the removal because of the change in induction from the second state to the first, or opposite, state. In the following moment of the same condition, the secondary coil B generates a merely weak current $g'$ correspondingly to a pulse g similarly to the moments b and c.

Figure 10:
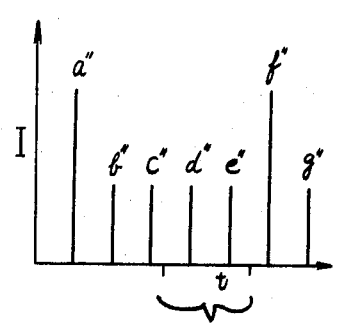

Referring now to FIG. 10, when an external magnetic field which does not magnetically saturate the core 21, is being applied thereto in the moments d and e, weak currents $d''$ and $e''$ are generated across the secondary coil B correspondingly to the pulses d and e because the residual induction is reversed but not such as to result in saturation in the second state. When the external magnetic field is removed, a strong current $f''$ is generated correspondingly to the first pulse $f$ after the removal, as before. In the following moment of the same condition, the secondary coil B generates a merely weak current $g''$ correspondingly to a pulse g similarly to the moments b and c.

In other words, when the magnet 23 is brought into proximity, its field in this case is not sufficient to saturate the magnetic core but does have a value equal to the negative coercive force so as to place the core in its second state. Subsequently, when input pulses d and e are applied to the primary coil of the core, the resultant magnetic force produces a change in induction from a value slightly less than the negative residual induction to a value slightly greater. In this case, the induction varies along the lower line of the square-wave characteristic in FIG. 4. Accordingly, small pulses $d''$ and $e''$ are induced in the secondary coil. When the permanent magnet 23 is removed from the vicinity of the core, the next pulse f causes a change from the second state of residual induction back to the first state, and accordingly a large output pulse $f''$ is produced. Therefore, the next input pulse g results in a small output pulse $g''$ as the induction varies from the positive residual induction to a value slightly greater.

Figure 11:
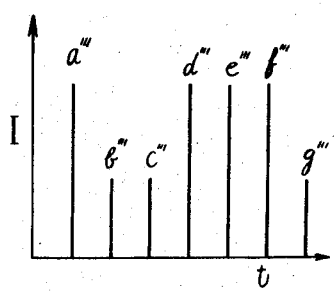

Referring now to FIG. 11, after the moments a, b and c similar to those shown in FIGS. 9 and 10, an external magnetic field which does not magnetically saturate the core 21 is applied thereto and the magnetic field is weakened little by little. While the pulses d, e, f and g successively flow across the primary coil A, secondary currents $d'''$, $e'''$ and $f'''$ which are strong similarly one after another are generated across the secondary coil B and, when the influence of the external magnetic field to the core 21 becomes weak enough, the subsequent secondary current $g'''$ becomes suddenly weak.

In other words, the magnetic field generated by the permanent magnet is weak, although sufficient to switch the magnetic core to its second state. Accordingly, with the arrival of the input pulse d, the core switches back to its first state, thereby producing a large output pulse $d'''$. With removal of the pulse d, the core switches back to its second state, due to the influence of the permanent magnet's field, and at the arrival of the input pulse e, the core again switches back to its first state. With removal of the input pulse e, the core switches back to its second state. At about this time, the effective field of the magnet is diminished, as by physical separation between the magnet and the core. However, the field is still sufficient after the application of pulse c to switch the core back to its second state. When the core is switched again to its first state upon application of pulse $f$, the field generated by the magnet is not sufficient to switch the core back to its second state. Accordingly, the core remains in the first state, and upon arrival of the next pulse g, a small output pulse $g'''$ is generated in a manner identical to that in FIGS. 9 and 10.

EXAMPLE 1

Figure 12:
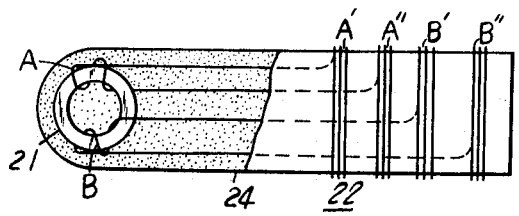
FIG. 12 is a schematic view of the detector showing the structure thereof.

Referring more particularly to FIG. 12, a detecting element 22 will now be concretely described. There is provided a ring core 21 of ferrite having an outer diameter of 0.3 mm. and an inner diameter of 0.15 mm. A primary coil A and a secondary coil B of enameled wire having an outer diameter of 0.05 mm. are coiled on the core 21 by two turns, respectively. The entire structure is protected by coating it with a fixing agent 24 of varnish, synthetic resin or the like. The other end of the detecting element 22 is provided with four terminals A', A" and B', B" arranged in succession thereon and soldered with ends of the coils A and B from which the enamel insulation is removed, so as to facilitate connection with external circuits, respectively. The detecting element 22 connected as above is in the form of a round bar having a diameter of 0.4 mm. and compact enough to be mounted easily on and in any place.

Figure 13:
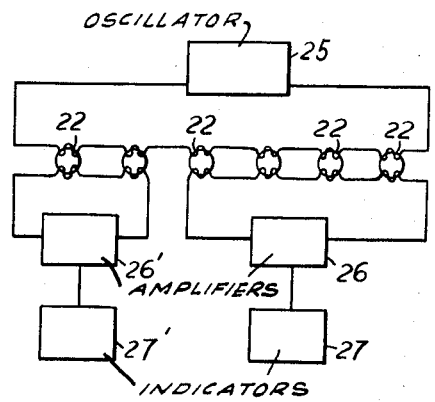
FIG. 13 is a circuit diagram of a detecting means embodying this invention.

Referring more particularly to FIG. 13, an arrangement of the detector will now be described. There are, for example, six points to be detected where the same detecting elements one after another are provided, respectively. The six primary coils A are connected in series with an oscillator 25 so as to energize these primary coils A with a pulsating current as shown in FIG. 8, 0.25 ampere-turn flowing across each primary coil A. The induced currents or secondary currents generated at the secondary coil B connected in series are fed, if necessary, upon being divided into some groups, to discriminating current amplifiers 26, 26', whence the amplified currents are used as outputs, for example, fed to such indicators 27, 27' as counters, decatron counters, buzzers, lamps, and the like, respectively.

EXAMPLE 2

Figure 14:
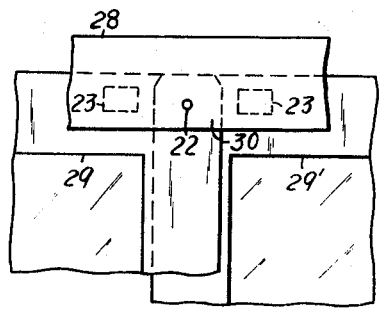
FIG. 14 is a partly removed front view of a double sliding door provided with the electromagnetic detecting means embodying this invention.
Figure 15:
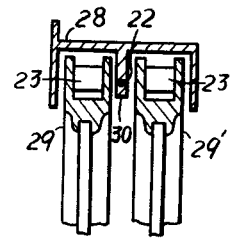
FIG. 15 is a vertically sectional view of the double sliding door shown in FIG. 14.

Referring more particularly to FIGS. 14 and 15, an application of the detecting element 22 to a double sliding window will now be described. A pair of sashes 29 and 29' made of aluminum are adapted to be slidable along a double-grooved head jamb 28. The detecting element 22 is arranged inside the central rib 30 of the double-grooved head jamb 28. The upper member of the sashes 29 and 29' are provided with a pair of permanent magnets 23, which are arranged near the cooperated corners with each other but they are spaced from the detecting element 22 in the window sliding direction so that the detecting element 22 is not affacted by the permanent magnets 23 when the double sliding window is closed by the pair of sashes 29 and 29'. When the window is opened, that is, either sash 29 or 29' is slid, either of the two permanent magnets 23 approaches the detecting element 22. During the window is closed, the primary coil A of the detecting element 22 is similarly repeatedly energized only by a pulsating current, so that a weak induced current is generated by the secondary coil B correspondingly thereto. When either of the sashes 29 and 29' is slid so as to allow the permanent magnet 23 to come near the detecting element 22, the detecting element 22 is affected magnetically by the magnet 23. When the magnetic action has ended by either passing the nearest position or closing the window again, a strong current is induced in the secondary coil B which acts on the indicating means 27 intermediate the discriminating current amplifier 26.

EXAMPLE 3

Figure 16:
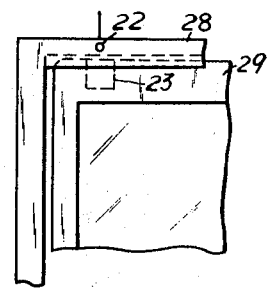
FIG. 16 is a partly removed front view of a single sliding door provided with the electromagnetic detecting means embodying this invention.

Referring more particularly to FIG. 16, there is a sliding door 29 which may be either a single sliding type or a double sliding type and is adapted to be cooperated with a head jamb 28. A detecting element 22 is embedded in the head jamb 28 while a permanent magnet 23 is provided in the upper member of the sliding door 29 in such a position that, when the door 29 is in the closed extreme position, the permanent magnet 23 is brought in alignment with the detecting element 22 across the jamb 28, so that the detecting element 22 is positioned within the magnetic field of the permanent magnet 23. When the door 29 is slid for opening the same, the permanent magnet 23 is receded from the detecting element 22 so that a strong induced current is generated in the detecting element 22 which operates an indicating means 27.

EXAMPLE 4

Figure 17:
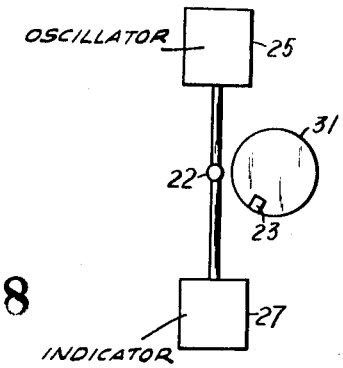
FIG. 17 is an explanatory view of the electromagnetic detecting means embodying this invention acting as a tachometer.

FIG. 17 shows, schematically, a tachometer to which the principle of this invention is applied. A permanent magnet 23 is fixed on a rotary matter 31 such as a shaft. The primary coil of the detecting element 22 is energized by a pulsating current generated by an oscillator 25. It is necessary that frequency of the pulsating current is higher than the rotation of the rotary shaft 31. By virtue of this arrangement, each approach of the permanent magnet 23 to the detecting element 22, that is, one turn of the shaft 31, generates a strong electromagnetically induced pulse across the secondary coil, which may be taken out of the detecting element 22 by an indicating means 27 for reading out the rotation.

EXAMPLE 5

Figure 18:
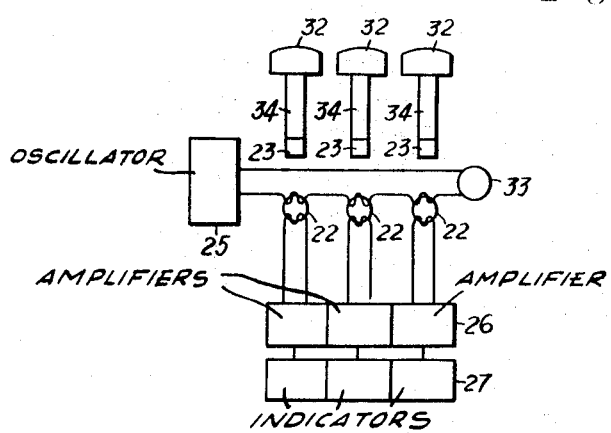
FIG. 18 is an explanatory view of an application of this invention to a computer.

FIG. 18 shows, schematically, a computer to which the principle of this invention is applied. A plurality of permanent magnets 23 are fixed on stems 34 of push buttons 32, respectively. Each permanent magnet 23 is adapted to approach a corresponding detecting element 22 by pushing down the button 32, so as to disturb the magnetic field of the detecting element 22. The primary coils A of the plurality of detecting elements 22 are connected in series one after another together with a switch 33 and an oscillator 25. The secondary coils B of the plurality of detecting elements 22 are connected with indicating means 26 intermediate amplifiers 26, respectively. When a push button 32 is pushed down, the magnetic field of the core 21 of the corresponding detecting element 22 is disturbed. If an indication is required, the primary coils A are energized by making the pulsating current at the switch 33, so as to generate a strong electromagnetically induced current across the secondary coil B of the detecting element 22 correspondingly to the push button 32 and operate corresponding indicating means 27 which indicates a situation of the push button 32 and will indicate another situation thereof when the same is moved so as to vary the magnetic field of the core 21 corresponding thereto.

While particular embodiments of this invention have been illustrated and described, modifications thereof will readily occur to those skilled in the art. It should be understood therefore that the invention is not limited to the particular structures disclosed but that the appended claims are intended to cover all modifications which do not depart from the true spirit and scope of the invention.

What is claimed as new and desired to be secured by Letters Patent of the United States is:

1. In a position detector, a permanent magnet affixed to a first member, and a detecting element affixed to a second member which is movable relative to said first member, said detecting element comprising:
   a. a magnetic core having a property of residual induction,
   b. a primary coil and a secondary coil wound on said magnetic core,
   c. a source of unidirectional pulsed current,
   d. means impressing said source of unidirectional, pulsed current across said primary coil, each pulse therefrom tending to establish, by electromagnet induction, a first state of residual induction in said core,
   e. said permanent magnet having a field sufficient to establish and maintain a second, opposite state of residual induction in said magnetic core when in proximity therewith so that when said permanent magnet is removed from the vicinity of said magnetic core, said source of unidirectional pulsed current restores said magnetic core to said first state of residual induction to produce a predetermined pulse sequence in said secondary coil,
   f. said detecting element further including indicating means responsive to said predetermined pulse sequence for indicating relative motion between said first and second members.

2. The combination as recited in claim 1, further comprising:
   a. a plurality of said position detectors, each including a permanent magnet affixed to a corresponding first member, and a detecting element affixed to a corresponding second member which is movable relative to said first member, each of said detecting elements including a primary coil,
   b. a single source of unidirectional, pulsed current, and
   c. means connecting said primary coils in series with each other and with said source.

3. The combination as recited in claim 1, wherein one of said first and second members comprises a head jamb and the other of said members comprises a sash.

4. The combination as recited in claim 1, wherein one of said first and second members comprises a rotating shaft and the other of said members comprises a bearing therefor.

5. The combination as recited in claim 4, wherein the frequency of rotation of said rotating shaft is less than the frequency of said source of unidirectional, pulsed current.

* * * * *